United States Patent [19]

Ishida et al.

[11] Patent Number: 4,725,150
[45] Date of Patent: Feb. 16, 1988

[54] DIGITAL THERMOMETER WITH VARYING RESOLUTION

[75] Inventors: Junichi Ishida, Uzumasa; Tamio Miyake, Enmyoji, both of Japan

[73] Assignee: Omron Tateisi Electronics Co., Kyoto, Japan

[21] Appl. No.: 813,872

[22] Filed: Dec. 27, 1985

[30] Foreign Application Priority Data

Dec. 29, 1984 [JP] Japan ............................ 59-281068

[51] Int. Cl.$^4$ .......................... G01K 7/00; G01K 7/16
[52] U.S. Cl. .................................... 374/170; 374/163
[58] Field of Search .................... 374/163, 170, 171; 364/557; 128/736

[56] References Cited

U.S. PATENT DOCUMENTS

| | | | |
|---|---|---|---|
| 2,769,340 | 11/1956 | Bernreuter et al. | 374/163 |
| 3,620,082 | 11/1971 | Peters | 374/170 |
| 4,050,309 | 9/1977 | Junkert et al. | 374/171 |
| 4,303,984 | 12/1981 | Houvig | 374/171 |
| 4,423,968 | 1/1984 | Nemcek, Sr. et al. | 374/170 |
| 4,466,749 | 8/1984 | Cunningham et al. | 374/170 |
| 4,504,922 | 3/1985 | Johnson et al. | 374/170 |
| 4,505,600 | 3/1985 | Suzuki et al. | 374/170 |
| 4,536,851 | 8/1985 | Germanton et al. | 364/557 |
| 4,559,954 | 12/1985 | Murase | 374/171 |
| 4,563,748 | 1/1986 | Hanaoka | 364/557 |

*Primary Examiner*—Charles Frankfort
*Assistant Examiner*—Thomas B. Will
*Attorney, Agent, or Firm*—Wegner & Bretschneider

[57] ABSTRACT

An electronic thermometer of the present invention includes: a temperature sensor for sensing temperature and outputting a digital signal value representative thereof; a temperature conversion data storage unit having at least a first data storage area for storing temperature conversion data of relatively high resolution and a second data storage area for storing temperature conversion data of relatively low resolution; a read-out element for, when the digital signal produced by the temperature sensor is within a first range, reading-out corresponding temperature conversion data from the first data storage area according to the value of the digital signal, and, when the digital signal, produced by the temperature sensor is within second range, reading out corresponding temperature conversion data from the second data storage area according to a selected value of the digital signal, and a display for displaying a temperature corresponding to the temperature conversion data. Whereby, when the temperature is in the first range, high resolutions and high accuracy of indication can be obtained while when the temperature is in the second range, low resolution which may be quite acceptable may be attained. Thereby, the capacity of the temperature conversion data storage unit may be more economically effectively utilized.

3 Claims, 4 Drawing Figures

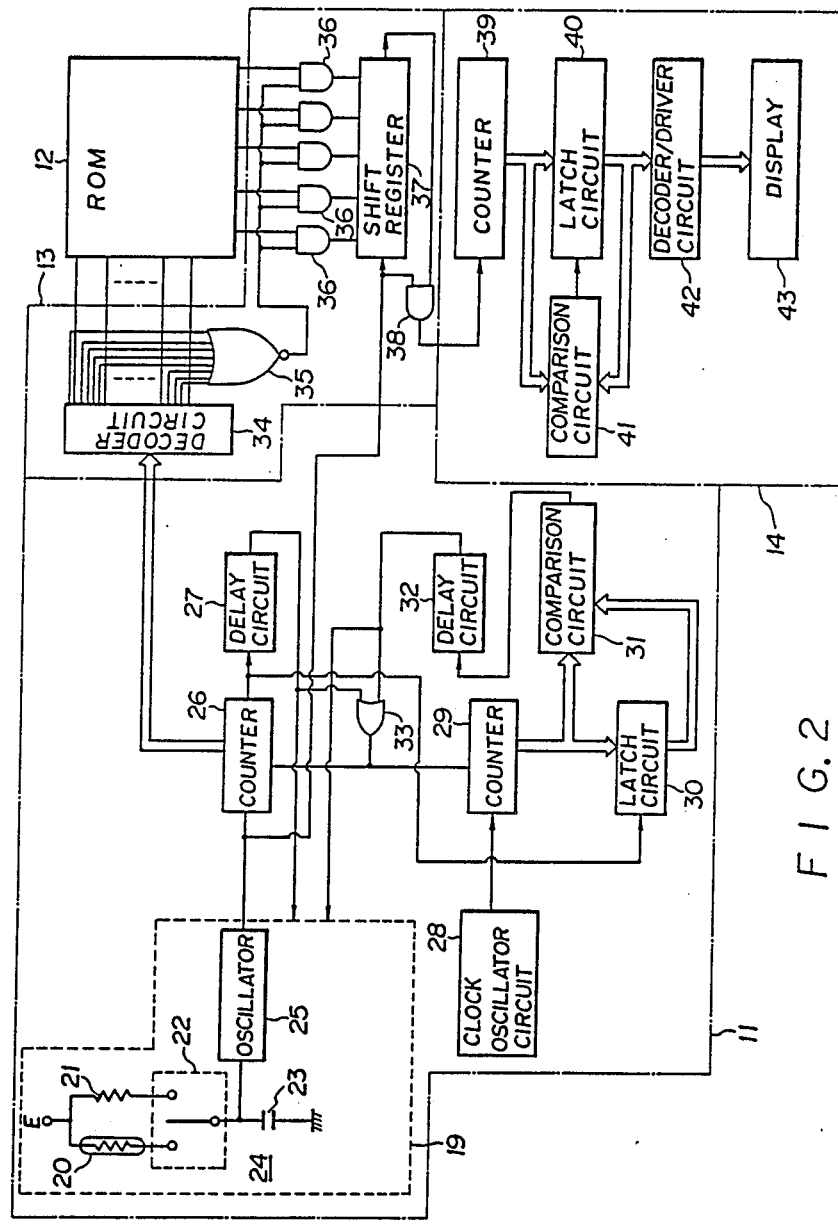
F I G. 2

DIGITAL THERMOMETER WITH VARYING RESOLUTION

BACKGROUND OF THE INVENTION

The present invention relates to an electronic thermometer, and in particular to an electronic thermometer which has different display resolutions depending upon temperature.

A conventional electronic thermometer typically senses temperature at its temperature sensing unit, which may comprise a temperature sensitive unit such as a thermistor, and outputs a digital signal corresponding to the sensed temperature. Then another unit of the thermometer reads out temperature conversion data which is previously stored in a memory means such as a ROM in advance, according to the value of a digital signal corresponding to said digital signal output by said temperature sensing unit. The read out temperature conversion data is then displayed on a display unit.

A typical such conventional electronic thermometer, which is a clinical thermometer, has a preset measuring range of for example from 35° to 42° Celsius, and does not display any specific temperature when the sensed temperature by the temperature sensitive unit is outside this range. Thus, for example, during the initial stage of measurement when the temperature sensed by the temperature sensitive means is low, only an indication of "L" is displayed on the display unit, and, once said temperature sensed by the temperature sensitive means becomes higher than 35° C., a specific temperature reading at a specific digitized resolution is displayed from then on.

According to such a conventional type of electronic clinical thermometer, the measurement resolution is thus decided to be, for example, 0.01° C., and then temperature readings are displayed for every 0.01° C. when the sensed temperature is in the temperature range for which indication is to be given. For example, temperature conversion data is required to be stored at steps of 0.01° C. for the entire range of 35° C. to 42° C. This requires a great deal of memory space, which is not actually being effectively utilized, since in the exemplary case of a clinical thermometer such a very accurate reading in the case that the sensed temperature is very wide of the typical body temperature of a human being is not actually required. If the range of measurement indication is to be expanded yet further, then this gives rise to the problem of requiring an expanded memory capacity for storing an accordingly large conversion data volume.

Further, in the case of a clinical thermometer which has a high resolution around the range of temperatures which a human body may have, if in view of memory limitations this measurement range is restricted, then the response time from the start of measurement to the appearance of a definite temperature on the display unit tends to become long, in other words the indication of "L" on the display unit persists for a long time, and the user tends to become irritated by this fact.

SUMMARY OF THE INVENTION

Accordingly, it is the primary object of the present invention to provide an electronic thermometer which overcomes the above outlined problems.

It is a further object of the present invention to provide such an electronic thermometer which has a wide range of temperature measurement capability.

It is a further object of the present invention to provide such an electronic thermometer which does not require an unduly large volume of temperature conversion data to be stored.

It is a further object of the present invention to provide such an electronic thermometer which is capable of displaying temperature measurement readings at high resolution.

It is a further object of the present invention to provide such an electronic thermometer which does not take an unduly long time to reach a range in which it displays proper indication of sensed temperature.

It is a yet further object of the present invention to provide such an electronic thermometer which is particularly suitable for use as a clinical thermometer.

According to the most general aspect of the present invention, these and other objects are accomplished by an electronic thermometer, comprising: (a) a means for sensing temperature and outputting a digital signal value representative thereof; (b) a temperature conversion data storage unit which comprises at least a first data storage area for storing temperature conversion data of relatively high resolution and a second data storage area for storing temperature conversion data of relatively low resolution; (c) a means for, when the digital signal produced by said temperature sensing means is within a first range, reading out corresponding temperature conversion data from said first data storage area according to the value of said digital signal, and, when the digital signal produced by said temperature sensing means is within a second range, reading out corresponding temperature conversion data from said second data storage area according to a selected value of said digital signal; and (d) a means for displaying a temperature corresponding to the temperature conversion data read out by said reading out means.

According to such a structure, as schematically shown in FIG. 1 of the accompanying drawings which is a schematic block diagram showing the overall structure of this digital thermometer, if for example the resolution of the display of temperature is to be 0.01° C. above 35° C. and is 0.1° C. below 35° C., then the first storage area 2a is used for storing high resolution temperature conversion data for temperatures above 35° C. at a relatively high resolution of 0.01° C., while the second storage area 2b is used for storing low resolution temperature conversion data for temperatures below 35° C. at a relatively low resolution of 0.1° C. And, accordingly, when a digital signal corresponding to the sensed temperature is outputted from the temperature sensing unit 1: if this digital signal corresponds to a temperature which is within the low resolution temperature range of below 35° C., then the read out means 3 reads out low resolution temperature conversion data from the second low resolution storage area 2b according to the digital signal; while, on the other hand, if this digital signal outputted from the temperature sensing unit 1 corresponds to a temperature which is within the high resolution temperature range of above 35° C., then the read out means 3 reads out high resolution temperature conversion data from the first high resolution storage area 2a according to the digital signal. In either case, the read out data is displayed on the display means 4. In other words, when a temperature below 35° C. is sensed by the temperature sensing unit 1 which outputs a corresponding digital signal, since this digital signal corresponds to the second range, the corresponding low resolution temperature conversion data is read out from the second storage area 2b, and the temperature, which is lower than 35° C., is displayed on the display unit 4 at the relatively low resolution of 0.1° C. On the other hand, when a temperature above 35° C. is sensed by the temperature sensing unit 1 which outputs a corresponding digital signal, since this digital signal corresponds to the first range, the corresponding high resolution temperature conversion data is read out from the first storage area 2a, and the temperature, which is higher than 35° C., is displayed on the display unit 4 at the relatively high resolution of 0.01° C.

Accordingly, it is seen that according to the present invention there is provided an electronic thermometer which overcomes the problems outlined hereinabove with respect to the prior art, and which has a wide range of temperature measurement capability, without requiring an unduly large volume of temperature conversion data to be stored. Further, this electronic thermometer is capable of displaying temperature measurement readings at high resolution, without taking an unduly long time to reach a range in which it displays proper indication of sensed temperature. Accordingly, this electronic thermometer is particularly suitable for use as a clinical thermometer.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

FIG. 2 is a detailed block diagram showing the circuitry of a portion of the preferred embodiment of the thermometer of this invention, said preferred embodiment thermometer being exemplarily a clinical thermometer;

DESCRIPTION OF THE PREFERRED EMBODIMENT

Figure 1:
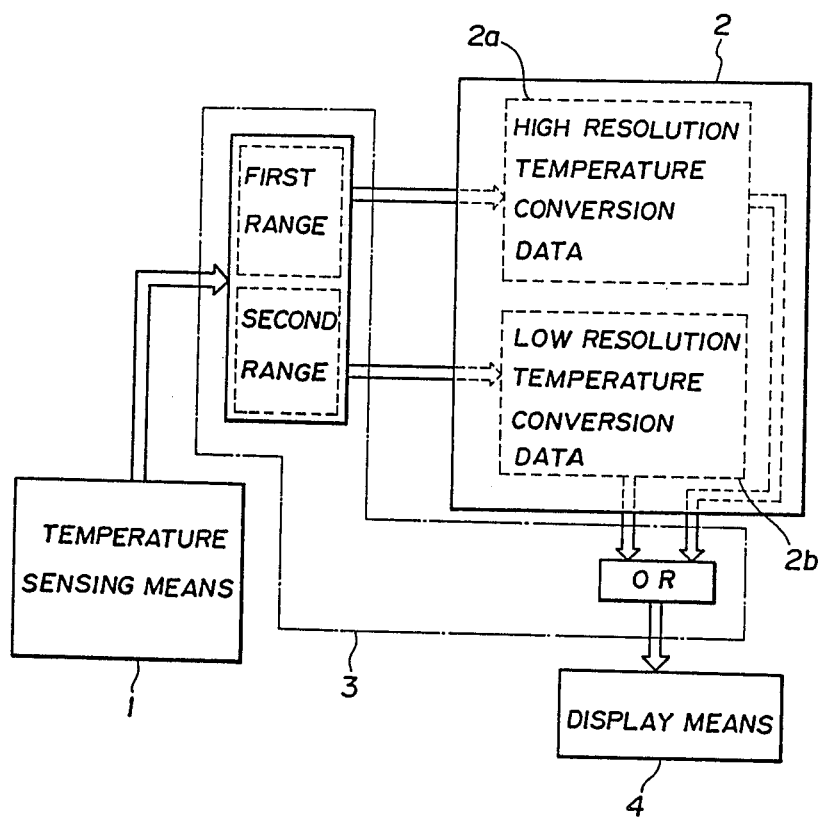
FIG. 1 is a a schematic block diagram showing the overall structure of this digital thermometer.

The present invention will now be described with reference to the preferred embodiment thereof, and with reference to the appended drawings. FIG. 2 is a detailed block diagram showing the circuitry of a portion of the preferred embodiment of the thermometer of this invention, said preferred embodiment thermometer being exemplarily a clinical thermometer. Referring first to the larger blocks of FIG. 2, the reference numeral 11 denotes a temperature sensing unit, while 12 is a temperature conversion data storage unit for storing temperature conversion data and conveniently is a ROM (read only memory), 13 is a temperature conversion data read out unit for reading out appropriate temperature conversion data from the ROM 12 according to a digital signal outputted from the temperature sensing unit 11, and 14 is a display unit. This clinical thermometer is particularly characterized by storing data in the ROM 12 and in comprising the temperature conversion data read out unit 13, and these features will be described in greater detail hereinafter.

In the temperature sensing unit, an oscillator unit 19 is provided, which comprises a time constant circuit 24 comprising a thermistor (temperature sensitive resistor) 20, a reference resistor 21, a switch over switch 22 and a capacitor 23, and an oscillator 25. From this oscillator unit 19, the output of the oscillator 25 is supplied to a counter 26, and the overflow output of this counter 26 is supplied both to a delay circuit 27 and also to a latch circuit 30. The output of the delay circuit 27 is supplied to the oscillator unit 19 and throws the switch 22 over to the side of connecting the thermistor 20 to the capacitor 23 and disconnecting the reference resistor 21 from said capacitor 23.

The output clock signal of a clock oscillator 28 circuit is counted by a counter 29, and the output of this counter 29 is supplied to the latch circuit 30 and also to a comparison circuit 31. The clock oscillator circuit 28, the counter 29, and the latch circuit 30 measure the time until the counter 26 overflows and temporarily retain this time.

The comparison circuit 31 compares the count of the counter 29 and the output of the latch circuit 30, and an agreement signal therebetweeen is supplied therefrom to the delay circuit 32. The output of this delay circuit 32 is supplied to the counters 26 and 29 by way of an OR circuit 33, and clears both these counters 26 and 29. The output of the delay circuit 32 is supplied to the oscillator unit 19 and throws the switch 22 over to the side of disconnecting the thermistor 20 from the capacitor 23 and connecting the reference resistor 21 to said capacitor 23.

The temperature conversion data read out unit 13 comprises a decoder circuit 34, a NOR circuit 35, a plurality of AND circuits 36, a shift register 37, and another AND circuit 38. The output of the counter 26 is supplied to the decoder 34. When the sensed temperature is within the range of 35° to 39° Celsius (exemplarily), then the output of the decoder 34 addresses the ROM 12 so that the temperature conversion data may be read out at a resolution of 0.01° C., i.e. at a relatively fine resolution. On the other hand, when the sensed temperature is outside said range, i.e. is below 35° C. or is above 39° C., then most of the output is supplied to the NOR circuit 35, while only one tenth of the output addresses the ROM 12, so that the temperature conversion data may be read out at a resolution of 0.1° C.

The ROM 12 stores temperature difference data corresponding to the count of the counter 26 at the resolution of, in the present example, 0.01° C. within the range of 35° C. to 39° C., and at the resolution of 0.1° C. or more roughly below 35° C. or above 39° C. The temperature difference data read out from the ROM 12 is preset in the shift register 37 by way of the AND circuits 36. And the output of the shift register 37 is supplied to one input of the other AND circuit 38, while an output pulse fx at the time of the connection of the thermistor 20 to the oscillator 25 is supplied to the shift register 37 as a clock pulse on the one hand and is also supplied to the other input of said other AND circuit 38. When a "1" signal is obtained at this AND circuit 38, the pulse signal fx (explained hereinafter) of the oscillator 25 is led out to the output end of said AND circuit 38 to be supplied to a counter 39 of the display unit 14. And this counter 39 counts the input pulses up to a value corresponding to a predetermined temperature value. Therefore, the counter 39 stores the temperature data sensed in the temperature sensing unit 11 for each sampling timing.

The outputs of the counter 39 and of the latch circuit 40 are compared by a comparison circuit 41. If the count of the counter 39 provdes to be greater than the data retained by the latch circuit 40, the contents of the counter 39 are latched in the latch circuit 40 and are updated therein. The data of the latch circuit 40 is supplied to the display for being shown to the user of this clinical thermometer by way of a decoder/driver circuit 42.

Now, the operation of this preferred embodiment of the thermometer of this invention will be explained.

When the switch 22 of the oscillator unit 19 is thrown over to its position which disconnects the thermistor 20 from the capacitor 23 and connects the reference resistor 21 to said capacitor 23, then the oscillation unit 19 oscillates at a frequency f0 which is determined by the resistance R of the reference resistor 21 and the static capacitance C of the capacitor 23. A pulse signal of this frequency f0 is outputted from the oscillator unit 25 and is supplied to the counter 26. Then the counter 26 starts counting this pulse signal of frequency f0. At the same time, the count of a clock signal of frequency fc from the clock oscillator circuit 28 is started by the counter 29. When the count in the counter 26 reaches a predetermined value N0, then its overflow output latches the count of the counter 29 at the latch circuit 30.

And the overflow output of the counter 26 is supplied to the oscillation unit 19 after a very slight time delay by the delay circuit 27, and throws the switch 22 over to its position which connects the thermistor 20 to the capacitor 23 and disconnects the reference resistor 21 from said capacitor 23, and also clears the counters 26 and 29 by way of the OR circuit 33. The thermistor 20 is connected to the oscillator 25 of the oscillation unit 19 and, at this time, oscillation takes place at a frequency which is determined by the resistance Rx of the thermistor 20 and the static capacitance C of the capacitor 23, and a pulse signal of frequency fx is outputted from the oscillator 25 and is inputted to the counter 26. Thereafter, the counter 29 counts the pulse signal of frequency fx. Meanwhile, the counter 29 receives again the clock signal of frequency fc from the clock oscillator 28 and counts it. When the count of the counter 29 reaches the count retained in the latch circuit 30, then the comparison circuit 31 detects the agreement and terminates the count of the counter 26. If the count of the counter 26 at this moment is Nx, it is known that the following relationship holds between the temperature T and the count Nx:

$$T = \frac{1}{\frac{1}{T} - \frac{1}{B} \cdot \ln \frac{Nx \, R0}{N0 \, R}}$$

where B is Boltzmann's constant and R0 is the resistance value at absolute temperature T0. And, if Nx is determined, the temperature T may be computed therefrom, since the other values in this equation are all constant.

The count Nx of the counter 26 determines the output value of the decoder 34, and the addressing of the ROM 12 is made based upon this output value. And, since the ROM 12 stores the temperature difference data corresponding to the advance of the count Nx from the beginning, the temperature difference data is preset on the shift register 37 so that the pulse signal of frequency fx supplied from the oscillator 25 by way of the AND circuit 38 is inputted to the counter 39. Therefore, the counter 39 stores the data which correspond to the current temperature of the current measurement reading.

The current temperature reading on the counter 39 is compared with the displayed temperature on the latch circuit 40 at the comparison circuit 41 and, if the current temperature is higher than the displayed temperature, the new contents are latched in the latch circuit 41 and the displayed temperature is updated. This displayed temperature is supplied to the display 43 by way of the decoder/driver circuit 42 to be displayed.

Thus, a temperature measurement of a sample time cycle is performed, and the output of the delay circuit 32 throws the switch 22 of the oscillator circuit 19 over to its position which disconnects the thermistor 20 from the capacitor 23 and connects the reference resistor 21 to said capacitor 23, and so to repeat the same sequence described above or to start the second sample time cycle. Similarly, the current of the second temperature measurement is stored in the counter 39 and, as long as the temperature rise continues, a new temperature reading is latched in place of the previous temperature reading to be displayed on the display unit as a new displayed temperature.

Thus, a current temperature is stored in the counter 39 for every sample timing cycle, and the highest temperature or the display temperature is always stored in the latch circuit 40, while the contents of the latch circuit 40 are always renewed as long as the temperature rise continues.

Figure 3:
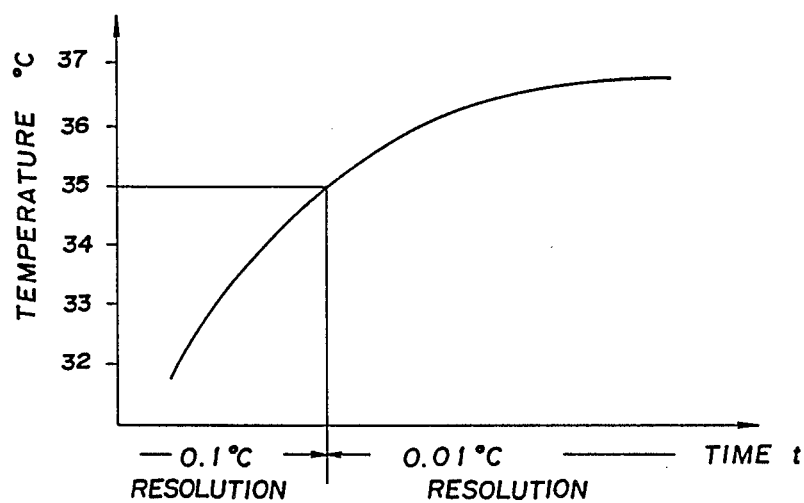
FIG. 3 is a graph, in which time is shown along the horizontal axis and temperature in degrees Celsius is shown along the vertical axis, showing the resolution of temperature indication obtained over a typical temperature measurement episode.

Further, according to the concept of the thermometer of the present invention, for the resolution power to differ depending upon whether or not the temperature is within the range of (in this exemplary preferred embodiment) 35° C. to 39° C., the operation is as described hereunder, with reference also to FIG. 3, which is a graph in which time is shown along the horizontal axis and temperature in degrees Celsius is shown along the vertical axis, showing the resolution of temperature indication obtained during a typical temperature measurement episode.

Figure 4:
FIG. 4 is a schematic illustration of how the resolution of temperature indication varies along with the temperature.

When the measurement has only just started, and the counter Nx of the counter 26 corresponds to a temperature in the range below 35° C., the count of the counter 26 addresses the ROM 12, and difference data is preset on the shift register 37 while 33.00 is stored in the counter 39. Then, even when the count of the counter 26 increases one by one, since the output of the decoder 34 is inputted to the NOR circuit 35 and the output of the NOR circuit 35 is "low", so as to cause one of the inputs of the AND circuit 36 to be "low", the shift register is all preset to zero, and the value stored in the counter 39 remains at 33.00. When there is a temperature change of 0.1° C., the output of the decoder 34 addresses the ROM 12, and, since the output of the NOR circuit 35 now becomes "high", the difference data 0.1° C. addressed in the ROM 12 is preset on the shift register 37 by way of the AND circuit 36. And the value stored in the counter 39 turns into 33.00+0.1=33.10. If the temperature rise continues further, the contents of the counter 39 keep changing for every temperature rise of 0.1° C., and the displayed temperature on the temperature display unit 43 changes into 33.20, 33.30, and so on. In other words, the resolution of the temperature display up to 35° C. is 0.1° C., as schematically shown in FIGS. 3 and 4.

However, when the count Nx of the counter 26 reaches the range corresponding to the temperature range of from 35° C. to 39° C., since the ROM 12 is completely addressed at every step of the output of the decoder 34, the stored temperature difference data is preset on the shift register 37 by way of the AND circuit 36 every time the ROM 12 is addressed, and the contents of the counter 39 changes for every temperature rise of 0.01° C. The display on the display unit 43 changes from 35.00 to 35.01, 35.02, and so on, and the resolution of the displayed temperature is 0.01° C., as shown schematically in FIGS. 3 and 4.

And, if the temperature should exceed 39° C., the resolution drops back to 0.1° C. in the same manner as provided for the temperature range below 35° C., as also shown schematically in FIGS. 3 and 4.

In the above described preferred embodiment, the resolution was changed between the range of below 35° C. and the range of from 35° C. to 39° C., and between said range of from 35° C. to 39° C. and the range of above 39° C., and this is appropriate for a clinical thermometer such as the thermometer shown; but this is not intended to be limitative of the present invention, whose concept is broad enough to embrace other ranges as appropriate for any particular application.

Also, although in the above described preferred embodiment of the present invention the temperature conversion data was stored as difference data, this is not intended to be limiting either, and it is possible to store the temperature conversion data itself. Further, although the shown preferred embodiment is an electronic clinical thermometer, this present invention is not limited thereto, but may be applied to other forms of thermometers other than clinical thermometers.

Thus it is seen that, according to the present invention, there is provided an electronic digital thermometer which overcomes the problems outlined hereinabove with respect to the prior art, and which has a wide range of temperature measurement capability, without requiring an unduly large volume of temperature conversion data to be stored. Further, this electronic thermometer is capable of displaying temperature measurement readings at high resolution, without taking an unduly long time to reach a range in which it displays proper indication of sensed temperature. Accordingly, this electronic thermometer is particularly suitable for use as a clinical thermometer.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

What is claimed is:

1. An electronic thermometer, comprising:
    (a) a means for sensing temperature and outputting a digital signal value representative thereof;
    (b) a temperature conversion data storage unit which comprises at least a first data storage area for storing temperature conversion data of relatively high resolution and a second data storage area for storing temperature conversion data of relatively low resolution;
    (c) a means for automatically selecting an appropriate reading mode corresponding to the sensed temperature, so that when the digital signal produced by said temperature sensing means is within a first range, corresponding temperature data is read from said first data storage area according to the value of said digital signal, and, when the digital signal produced by said temperature sensing means is within a second range, corresponding temperature conversion data is read from said second data storage area according to a selected value of said digital signal; and
    (d) a means for displaying a temperature corresponding to the temperature conversion data.

2. An electronic thermometer according to claim 1, wherein said relatively high resolution is ten times finer than said relatively low resolution.

3. An electronic thermometer according to claim 1, wherein said first range includes the average body temperature of a human being and a certain range around said average body temperature, and said second range includes temperature ranges on either side of said first range.

* * * * *